United States Patent [19]

Richardson

[11] 4,320,602

[45] Mar. 23, 1982

[54] STABILIZING STRUCTURES AGAINST OSCILLATION

[76] Inventor: John R. Richardson, 87 Kings Rd., Kinston-upon-Thames, Surrey, England

[21] Appl. No.: 112,620

[22] Filed: Jan. 16, 1980

[30] Foreign Application Priority Data

Jan. 17, 1979 [GB] United Kingdom ............... 01705/79

[51] Int. Cl.³ ............................................ E04H 12/00
[52] U.S. Cl. ....................................... 52/1; 52/173 R; 52/573; 52/167; 98/58
[58] Field of Search .................... 52/167, 218, 219, 73, 52/83, 1, 173, 573; 98/58–65; 126/307 R; 405/230, 231

[56] References Cited

U.S. PATENT DOCUMENTS

| 2,053,226 | 9/1936 | Ruge | 52/167 |
|---|---|---|---|
| 3,174,589 | 3/1965 | Chen | 52/1 |
| 3,245,177 | 4/1966 | Chen | 52/1 |
| 3,246,431 | 4/1966 | Faerber | 52/73 |
| 3,411,427 | 11/1968 | Graham et al. | 98/64 |
| 4,031,173 | 6/1977 | Rogers | 98/58 |

FOREIGN PATENT DOCUMENTS

| 681394 | 3/1964 | Canada | 52/573 |
|---|---|---|---|
| 2616899 | 4/1976 | Fed. Rep. of Germany | 52/1 |
| 1282281 | 12/1961 | France | 98/58 |
| 348989 | 5/1931 | United Kingdom . | |
| 950983 | 3/1964 | United Kingdom . | |
| 1348763 | 3/1974 | United Kingdom . | |
| 1493715 | 11/1977 | United Kingdom . | |

Primary Examiner—James L. Ridgill, Jr.
Attorney, Agent, or Firm—Oblon, Fisher, Spivak, McClelland & Maier

[57] ABSTRACT

A device for stabilizing structures such as chimneys and like stacks against transverse oscillation, comprising a mass connected to the structure by a pendulum suspension so as to oscillate in a direction transverse to the axis of the structure. The pendulum suspension includes a damper. The oscillation frequency of the mass/pendulum/damper assembly is matched to the natural frequency of the structure's vibrations, whereby the latter are attenuated. The mass may be in the form of a ring, suspended from the top of the structure by at least three pendulum/damper units spaced around the periphery. The units may also include springs or other devices to modify the natural frequency of oscillation of the device. In one version of the invention the mass comprises a first ring suspended from the structure, and a second ring similarly suspended from the first ring.

8 Claims, 9 Drawing Figures

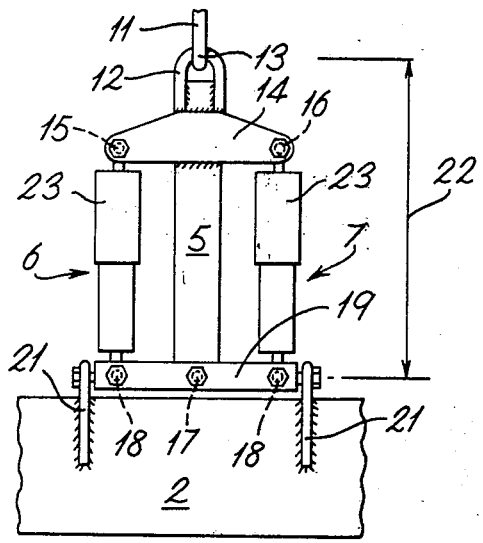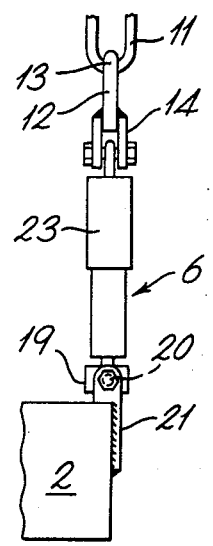
Fig. 4　　　　Fig. 5
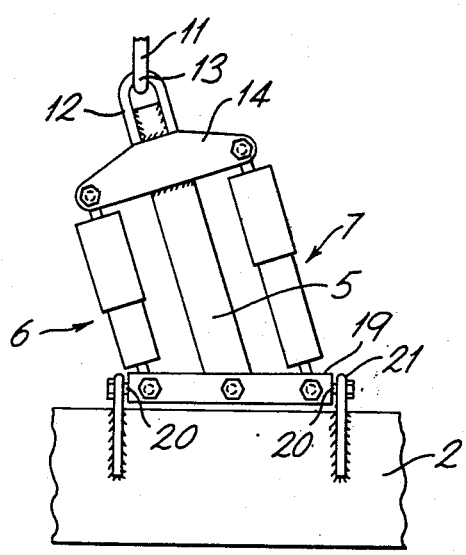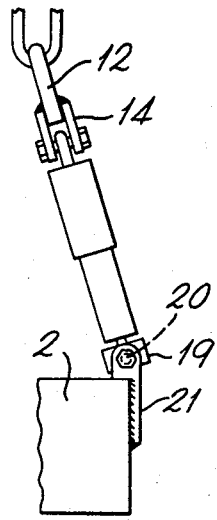
Fig. 6　　　　Fig. 7

STABILIZING STRUCTURES AGAINST OSCILLATION

This invention relates to stabilising bluff elongated structures against transverse oscillation. It relates especially to the stabilising of vertical structures against horizontal oscillation, and in particular to the stabilising of vertical structures supported at one end, such as tall chimneys, towers and stacks, against wind-excited horizontal oscillations, particularly oscillations in directions at right angles to that of the wind. However the invention applies also to oscillations excited otherwise, for instance by earthquakes.

In principle it is well known that such oscillations can be diminished, if not prevented, by attaching a relatively small mass to the structure by means of a suspension including a spring and a damper. By correcting matching the mass with the relevant parameters of the structure and the suspension, a condition can often be reached which oscillating transverse forces set up against the structure by the wind are opposed by equal and opposite transverse forces due to the oscillation of the mass, whereby the amplitude of vibration of the structure at a resonant frequency can be restricted significantly. A known stabilising device particularly suitable for chimneys and the like comprises a ring, slightly larger in diameter than the chimney itself, mounted close to the top of the chimney and coaxial with it. At least three short, rigid pendulums are pivoted to the ring at points equispaced around it circumference, and the other ends of these pendulums are pivoted to the chimney slightly above the level of the ring, for instance to the painters' rail that is often formed at the top of metal chimney stacks or towers. Assuming only small transverse oscillations of the pendulums, the ring is then constrained to horizontal movements in a single transverse plane. These movements are damped by damper units extending substantially horizontally between the ring and the body of the chimney.

While useful stabilisation has been obtained from such devices, they have also displayed several disadvantages. These have related particularly to the dampers. The amplitude and velocity of the typical swinging movements of a ring of convenient mass are often larger than the equivalent quantities for commercially-available damper units, so that such units can only be used if the mass of the ring is increased beyond what is desirable. Other obvious disadvantages are that dampers so arranged can only be connected to the chimney on site, that many dampers are so constructed that they are restricted to lower maximum velocity in use when arranged horizontally than when vertical, and that conventional telescopic dampers are notoriously more vulnerable to corrosion and like attack when arranged horizontally than when with the cap uppermost.

The present invention arises from appreciating that it is possible to arrange the dampers differently, so that they still exert the necessary effect upon the essentially transverse relative motion of mass and structure but so that they are less subject to the disadvantages just listed. According to the invention a device for stabilising bluff elongated structures against transverse oscillation comprises a mass connected to the structure by a pendulum so as to be capable of oscillating motions in a transverse direction, in which the suspension includes a pendulum, and also a damper the line of action of which lies substantially parallel to that of the pendulum.

The pendulum and damper may be parts of a composite unit pivoted to the structure at one end and to the mass at the other. Such a composite unit may include more than one damper.

The mass may be ring-like so as to encompass the structure and the suspension may maintain the plane of the ring perpendicular to the axis of the structure.

In particular the invention includes a device comprising such a ring suspended by at least three composite units. The lower ends of those units are pivoted to the ring at points equi-spaced around its periphery, and the upper ends are pivoted to the structure or to a supporting means fixed to it. The upper end pivots may allow rotation about both radial and tangential axes relative to the structure. The upper ends of the damper or dampers may be supported from the pendulum, and if there are two dampers to a unit the pendulum may for instance carry a cross-bar and the dampers may be suspended one from each arm of that bar. The lower ends of the dampers and pendulum may be joined to a common bar by pivots the axes of which lie parallel and in a substantially radial direction relative to the structure, and that bar may in turn be joined to the ring by a pivot with a substantially tangential axis.

The stiffness of the suspension unit, and hence the natural frequency of the device as a whole, may be modified by including springs in the composite units, for instance coil springs mounted concentrically with at least one of the dampers.

The invention includes a device in which a ring-like mass of composite form is used, comprising a first ring suspended from the structure and a second ring suspended in similar manner from the first ring.

The invention covers bluff, elongated structures when fitted with devices as just described. The device may have a single predominant natural frequency of oscillation which may be matched to the natural frequency of vibration of the structure. If the device has two natural frequencies of oscillation the higher of these may be matched with the natural frequency of the structure.

The invention will now be described, by way of example, with reference to the accompanying drawings. In the description the words "radial" and "tangential" relate to the chimney.

FIGS. 4 and 5 are respectively front and side elevations of a suspension unit as used in the device of FIG. 1, with the suspended mass in its undeflected position;

FIG. 6 is a front elevation of the same suspension unit with the suspended mass deflected tangentially;

FIG. 7 is a side elevation of the same suspension unit with the suspended mass deflected radially;

Figure 1:
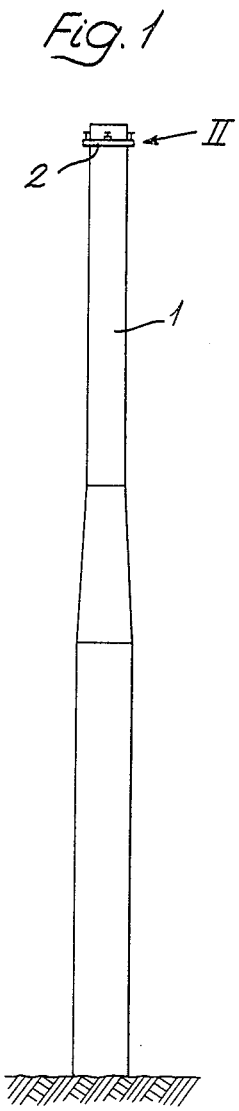
FIG. 1 is a side elevation of a chimney fitted with a device according to the invention.
Figure 2:
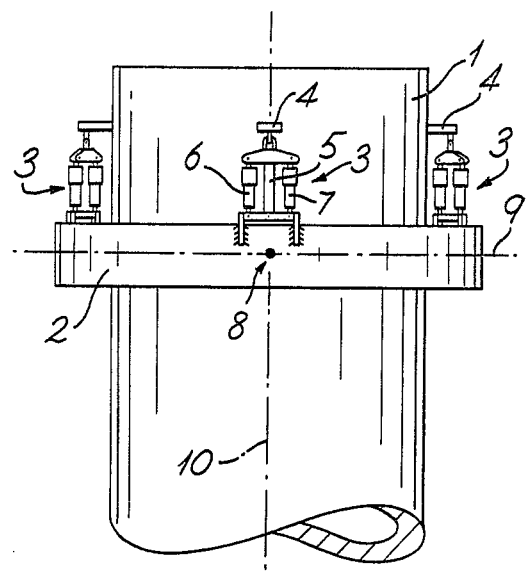
FIG. 2 is also an elevation, but on a larger scale, taken at the level of the arrow II in FIG. 1.
Figure 3:
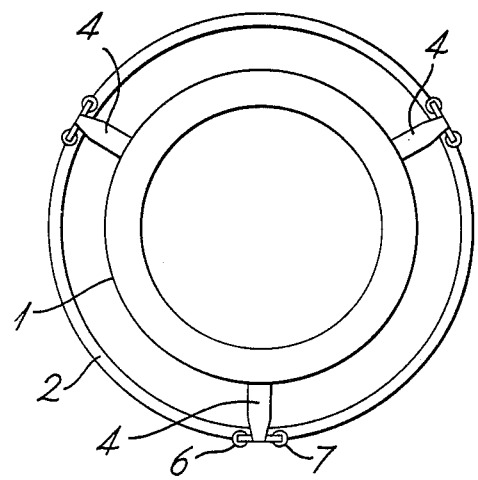
FIG. 3 is a plan view on the same scale as FIG. 2.

FIGS. 1 to 3 give a general impression of a typical metal chimney or stack 1—for instance 200-250 feet high, about 8 feet in diameter at the top and with a typical bending frequency of 0.7 Hz—stabilised by a device according to the present invention. The device comprises a solid metal ring 2, typically about 10 feet in diameter and weighing 1½ tons, suspended by units 3 from brackets 4 mounted close to the top of chimney 1. As will be explained with reference to FIGS. 4 to 7, each unit 3 comprises both a pendulum 5 and two dampers 6 and 7, and the suspension is such that for small swings of units 3 the centre of gravity 8 of ring 2 is confined to the plane represented by line 9 in FIG. 2 but can move in all directions within that plane. Plane 9 lies at right angles to the axis 10 of chimney 1.

As FIGS. 4 to 7 show, brackets 4 support U-shaped rings 11 which interlink with similar but inverted rings 12 carried by the units 3, thus providing a pivotal joint 13 giving freedom of rotation about both radial and tangential axes. Rings 12 are welded to the rigid shaft of pendulum 5 which carries a cross-bar 14, and the upper ends of the two telescopic dampers 6, 7 are pivoted at 15, 16 to the opposite ends of bar 14, in a manner offering some freedom of rotation about radial axes but little or no such freedom about tangential axes. The bottom ends of pendulum 5 and dampers 6, 7 are pivoted at 17, 18 to a bar 19, these pivots allowing rotation about radial axes only, and bar 19 is in turn pivoted at 20 to brackets 21 fixed to ring 2, the pivot at 20 allowing rotation about a tangential axis only.

The effective pendulum length of each unit 3, upon which the frequency of swinging oscillation of ring 2 depends, is the nominal vertical between pivots 13 and 17, represented by arrow 22 between FIGS. 4 and 5.

Provided the three suspension units 3 swing through only small angles so that the effective vertical length represented by arrow 22 does not substantially change, the centre of gravity 8 of ring 2 is constrained to movement within a single transverse plane, and whenever it moves out of alignment with axis 10 the pendulum of each unit 3 provides a gravity restoring force to oppose the bending of the chimney which caused the misalignment. The sum of these forces acts through centre of gravity 8 to give ring 2 equal natural frequencies in both sway and surge, that is to say two orthogonal directions lying within the transverse plane and passing through axis 10. They also oppose yawing motion of ring 2—that is to say rotation of the ring about axis 10—and produce the same natural frequency in that direction as well. However, as FIGS. 6 and 7 show, dampers 6, 7 are subjected to telescopic action only when bars 19 by which they are attached to ring 2 execute a motion with a tangential component (as in FIG. 6) but not when the bar moves purely radially (as in FIG. 7). Where there is a component of tangential motion the sum of the velocity-dependent forces set up in all the dampers 6, 7 again acts through the centre of gravity 8 and damps surge and sway equally. It will be appreciated that with three (or more) units 3 equi-spaced around ring 2 the resolved vectorial sum of the individual damping forces set up in all the units 3 will in fact equal one half of the total of those forces when considered regardless of direction. However if the ring tends to yaw around the chimney all the dampers are acting parallel to the direction of this and therefore no resolution is necessary; such motion is thus "double-damped" which is appropriate since it is an unwanted motion which is not associated with bending of the chimney and does not help to resist such bending.

Some advantages obtainable by use of the invention will be readily apparent from the drawings. For instance, by altering the length of cross-bar 14 and bar 19 it is possible to accommodate for different stroke or maximum velocity characteristics of whatever dampers are conveniently available. Also, the dampers are mounted substantially vertically with their caps 23 uppermost, which is their best operating position and preferable to a horizontal position for reasons already explained. Furthermore, the only points of attachment between device and chimney that must be made on site are the joints 13, although it may also be convenient to make the ring 2 in two semi-circular halves and assemble these on site.

While the invention has been described with reference to a cantilever-supported chimney of circular section standing in air, the invention applies also to structures of other bluff cross-sections, for instance hexagonal or other polygonal section, including for example whole tall buildings. It can also apply to structures supported at both ends, for example the exposed legs of tall platforms, and to structures exposed to media other than air, for example to underwater piles or legs. The invention includes in particular the cases in which the mass is not a ring—for instance where it is a simple solid lump, and in which a ring-shaped mass does not encompass a hollow structure like a chimney but is suspended inside it. Such an application like this last is only probable where the inevitable obstruction caused by the ring within the bore of the hollow structure is not objectionable, and where the atmosphere within will not be harmful to the device. The invention also applies to constructions similar to those illustrated, but in which the units 3 are turned through a right angle so that the damping effect is associated with radial motion instead of tangential. With such an arrangement the lateral characteristics of the system would be unaffected, but yawing motion of ring 2 would be undamped.

Applications of the invention are also envisaged where the mass is joined to the structure by two or more different forms of suspension, each tuned to help diminish a different mode of vibration of the structure.

Figure 8:
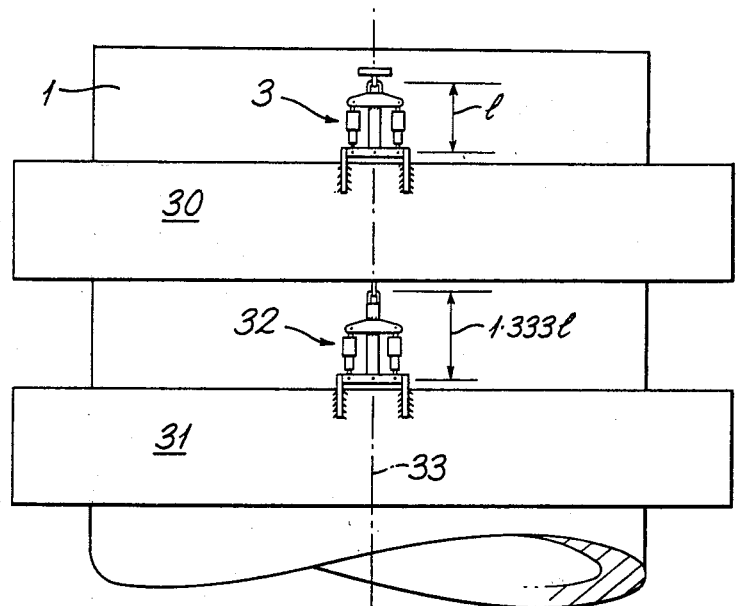
FIG. 8 is a side elevation of a chimney fitted with another device according to the invention.
Figure 9:
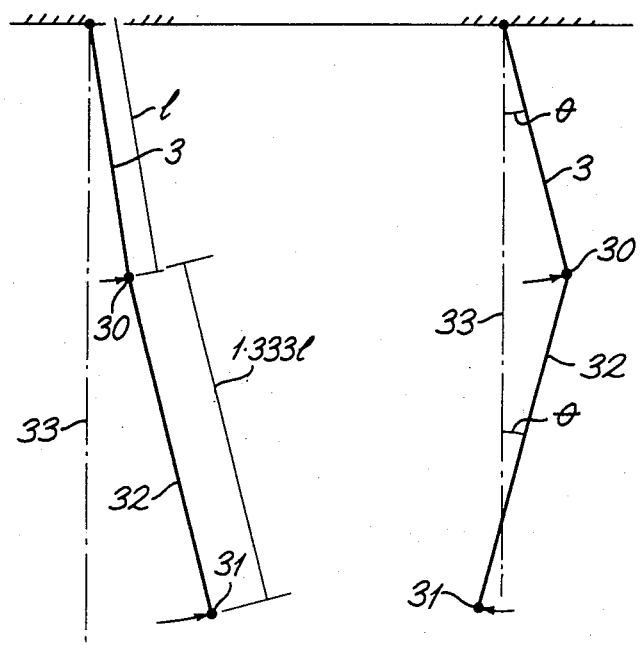
FIG. 9 is a schematic representation of modes of operation of the device of FIG. 8.

Typically, it is found that bending of the structure is minimised by tuning the oscillation frequency of the suspended mass of the device to a value slightly less than the fundamental bending frequency of the structure. Where the required frequency is high enough to make the length of pendulums 5 impractically short, the pendulum stiffness can be increased by coil springs, for instance vertical coil springs mounted concentrically with one or more of dampers 6, 7. However, the required size of such springs may in practice be impossibly large, and another way of achieving a high frequency of vibration without such springs or an inconveniently short pendulum length is demonstrated by the version of the device illustrated in FIGS. 8 and 9. Here the mass is of composite form comprising a first ring 30 and a second ring 31. Ring 30 is connected to chimney or stack 1 by units 3, each comprising a pendulum 5 and two dampers 6 and 7, as shown in previous figures. Ring 31 is in turn suspended not from the chimney but from ring 30 by similar units 32. While the suspension of ring 30 from chimney 1 thus permits that ring to move substantially transversely relative to the chimney, but without substantial axial movement (provided the amplitude of swing of units 3 is small), so units 32 permit the same freedom of movement to ring 31 relative to ring 30. Tests indicate that when such a two-ring mass is set into oscillation by transverse vibration of the chimney 1 to which ring 30 is directly connected, this oscillation comprises two modes. Broadly speaking, the first of these modes reflects that proportion of the movement of the two rings 30, 31 during which they are moving in the same transverse direction as each other, and the second mode reflects the remainder of the movement during which they are moving in opposite transverse directions. It has been found preferable that the masses of the two rings 30, 31 should be equal, and that the pendulum length of units 32 by which ring 31 is suspended from ring 30 should be one-third greater than that of units 3 by which ring 30 is suspended from chimney 1. This relationship between the length of units 3, 32 creates a condition whereby in the second mode of oscillation of the device the angle $\theta$ which units 3, 33 make to the vertical at maximum amplitude is the same, thus ensuring that the damping force exerted on the chimney by the device as a whole during this mode is as linear as possible. FIG. 9 is in two parts, showing firstly the position of the two rings 30, 31 both to the same side of the vertical 33 and at maximum amplitude in the first mode of oscillation, and secondly their locations on opposite sides of vertical 33 at maximum amplitude in the second mode. In the second case the two units 3, 32 make equal angles $\theta$ with the vertical. If the pendulum length of units 3 is l then the total pendulum length of the device shown in FIGS. 8 and 9 is $2\frac{1}{3}l$. The frequency of the device when operating in the first mode of oscillation is $\sqrt{g/2l}$, that is to say equivalent to the frequency of a single-ring device of pendulum length 2l. When oscillating in the second mode, however, the frequency equals $\sqrt{3 g/l}$, equivalent to the oscillation frequency of a single-ring device of pendulum length $\frac{1}{3}l$, that is to say only one-third of the length of pendulum units 3 in FIGS. 8 and 9. When it is required to damp the transverse oscillations of a chimney or stack with a high natural transverse oscillation frequency, a device as shown in FIGS. 8 and 9 may be fitted and tuned so that the natural frequency of the chimney is matched to the oscillation frequency of the device in its second mode: in these circumstances the lower first mode frequency of the device will be mismatched with the frequency of the chimney, and is likely to be of no practical effect.

I claim:

1. A device for stabilizing a bluff elongated structure against transverse oscillation comprising:
    a mass;
    a first suspension connecting said mass to said structure whereby said mass is capable of oscillating motions in a transverse direction relative to said structure, and in which said suspension includes;
    a pendulum;
    a damper the line of action of which lies substantially parallel to said pendulum; and in which said pendulum and said damper are parts of a composite unit pivoted at one end to said structure and at the other end to said mass.

2. A device according to claim 1 in which said composite unit includes more than one said damper.

3. A device according to claim 1 in which springs are included in said composite units, whereby to modify the stiffness of said first suspension and hence the natural frequency of said transverse oscillating motions of said mass.

4. A device according to claim 3 in which such a said spring is in the form of a coil spring and is mounted concentrically with one of said dampers.

5. A device according to claim 1 in which said mass is of ring like shape so as to encompass said structure and in which said ring-like mass is of composite form, including:
    a first ring connected to said structure by said first suspension; and
    a second ring connected to said first ring by a similar and second suspension.

6. A device according to claim 5 in which the pendulum length of said second pendulum-type suspension is greater by approximately one-third than the pendulum length of the first pendulum-type suspension.

7. A bluff including elongated structure; a device stabilising said structure against transverse oscillation and comprising:
    a ring-like mass of composite form, encompassing said structure and comprising a first ring and a second ring;
    a first pendulum-type suspension connecting said first ring to said structure whereby said first ring is capable of oscillating motions in a transverse direction relative to said structure;
    a second pendulum-type suspension connecting said second ring to said first ring whereby said second ring is capable of oscillating motions in a transverse direction relative to said structure, and
    in which said structure has an ascertainable natural frequency of transverse oscillation; in which said device has two predominant natural frequencies of transverse oscillation, and in which the higher of said two natural frequencies of said device is matched to said natural frequency of said structure.

8. A bluff, elongated structure according to claim 7 in which the pendulum length of said second pendulum-type suspension is greater by substantially one-third than the pendulum length of said first pendulum-type suspension.

* * * * *

UNITED STATES PATENT AND TRADEMARK OFFICE
CERTIFICATE OF CORRECTION

PATENT NO. : 4,320,602
DATED : March 23, 1982
INVENTOR(S) : Richardson

It is certified that error appears in the above-identified patent and that said Letters Patent is hereby corrected as shown below:

Col. 1, line 18, "correcting" should be --correctly--

Col. 1, line 21 -- in --should be inserted after "reached"

Col. 6, line 25 should read --7. A bluff, elongated structure including a device --

Signed and Sealed this

Twenty-fifth Day of January 1983

[SEAL]

Attest:

Attesting Officer

GERALD J. MOSSINGHOFF

Commissioner of Patents and Trademarks